(12) United States Patent
Brantner

(10) Patent No.: US 10,460,583 B1
(45) Date of Patent: Oct. 29, 2019

(54) GPS MONITORING SYSTEM AND ASSOCIATED USE THEREOF

(71) Applicant: Michael Brantner, Wonder Lake, IL (US)

(72) Inventor: Michael Brantner, Wonder Lake, IL (US)

( * ) Notice: Subject to any disclaimer, the term of this patent is extended or adjusted under 35 U.S.C. 154(b) by 2 days.

(21) Appl. No.: 15/858,907

(22) Filed: Dec. 29, 2017

Related U.S. Application Data

(60) Provisional application No. 62/417,662, filed on Nov. 4, 2016.

(51) Int. Cl.
*G08B 1/08* (2006.01)
*G08B 21/02* (2006.01)
*G01S 19/14* (2010.01)
*H04W 4/029* (2018.01)

(52) U.S. Cl.
CPC .......... *G08B 21/0269* (2013.01); *G01S 19/14* (2013.01); *G08B 21/0205* (2013.01); *H04W 4/029* (2018.02)

(58) Field of Classification Search
CPC ........... G08B 21/0269; G08B 21/0205; H04W 4/029; G01S 19/14
USPC ....................................... 340/539.13, 539.12
See application file for complete search history.

(56) References Cited

U.S. PATENT DOCUMENTS

| | | | | |
|---|---|---|---|---|
| 6,008,756 A | * | 12/1999 | Boerhave | A01B 79/005 342/357.52 |
| 6,888,464 B1 | * | 5/2005 | Maloney | G08B 21/0269 340/539.1 |
| 9,747,770 B1 | * | 8/2017 | Bartlett | G08B 21/0269 |
| 2007/0018812 A1 | * | 1/2007 | Allen | G08B 21/0202 340/539.13 |
| 2012/0203076 A1 | * | 8/2012 | Fatta | A61B 5/681 600/300 |
| 2012/0223834 A1 | * | 9/2012 | Hyatt | G08B 21/0247 340/539.13 |
| 2017/0193787 A1 | * | 7/2017 | Devdas | G08B 21/0261 |
| 2017/0295476 A1 | * | 10/2017 | Webb | H04W 4/12 |
| 2017/0365147 A1 | * | 12/2017 | Pence | G08B 21/0261 |
| 2017/0374506 A1 | * | 12/2017 | Rai | H04W 4/021 |

* cited by examiner

*Primary Examiner* — Naomi J Small

(57) ABSTRACT

A GPS monitoring system includes a portable child wristband including a first GPS transceiver, a portable adult wristband including a second GPS transceiver in continuous communication with the first GPS transceiver, a portable electronic device in communication with each the child wristband and the adult wristband, and at least one communications network in communication with each the child wristband, adult wristband, and the portable electronic device. The portable electronic device includes a display screen, a processor in communication with each the first GPS transceiver and second GPS transceiver and the display screen, and a memory communicatively coupled to the processor. The memory includes software instructions, when executed by the processor, that monitors whether a real-time location of the child wristband relative to a real-time location of the adult wristband is within an authorized maximum distance and within at an authorized geographic location and during an authorized time period.

1 Claim, 3 Drawing Sheets

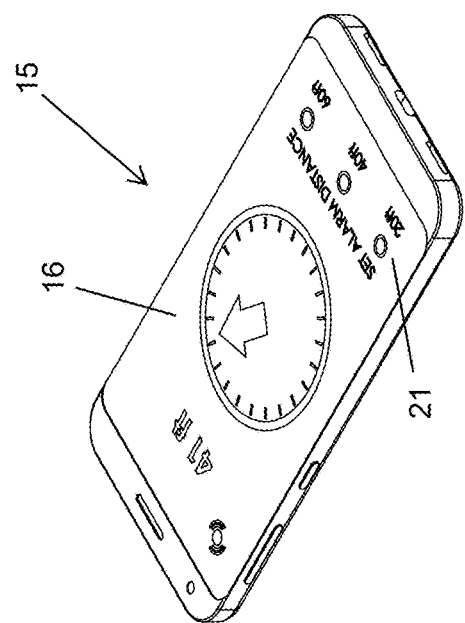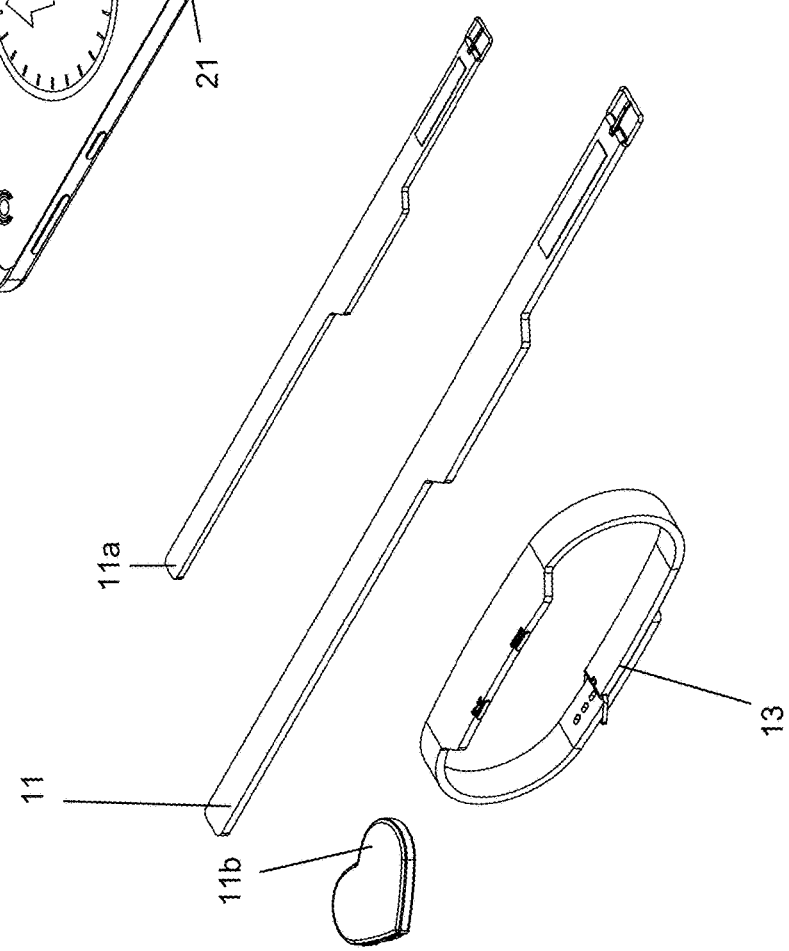

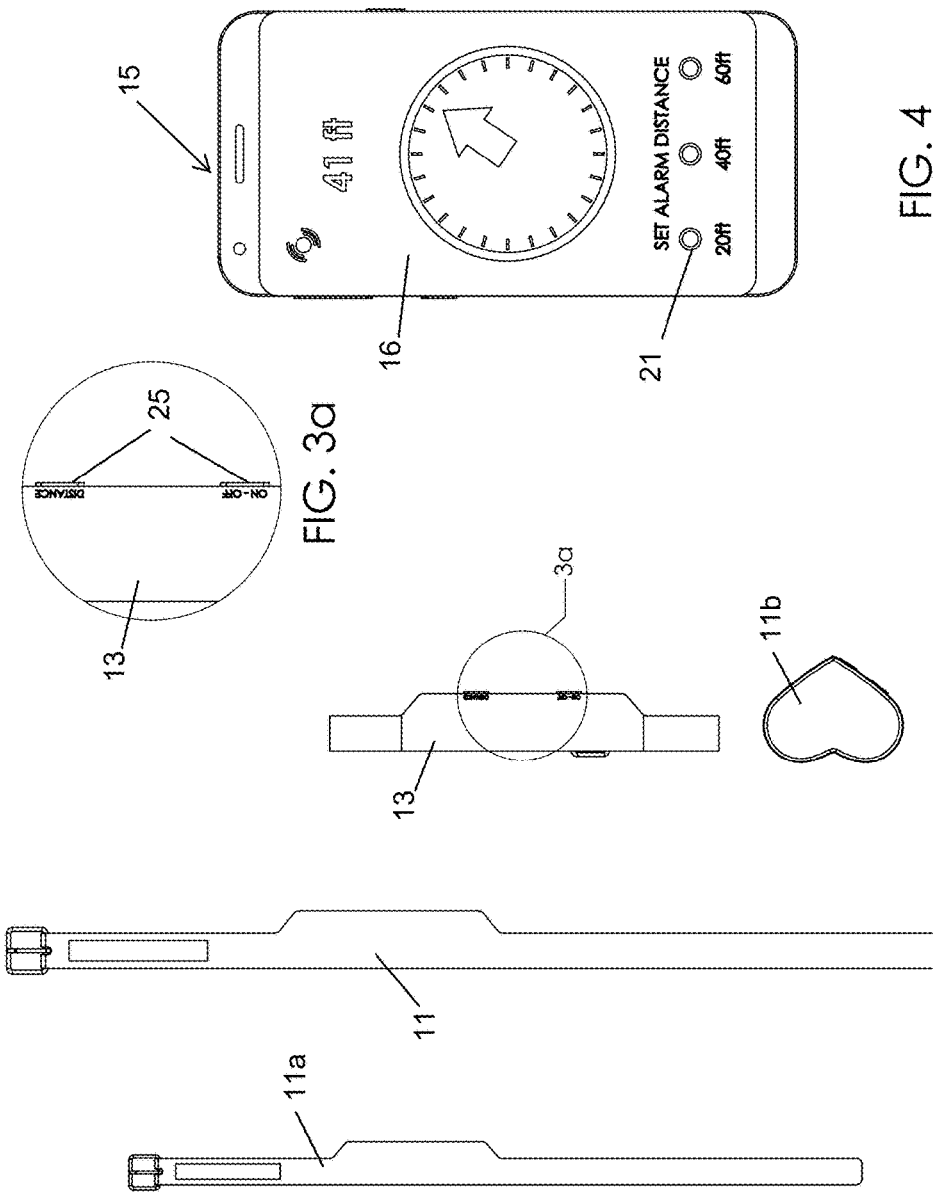

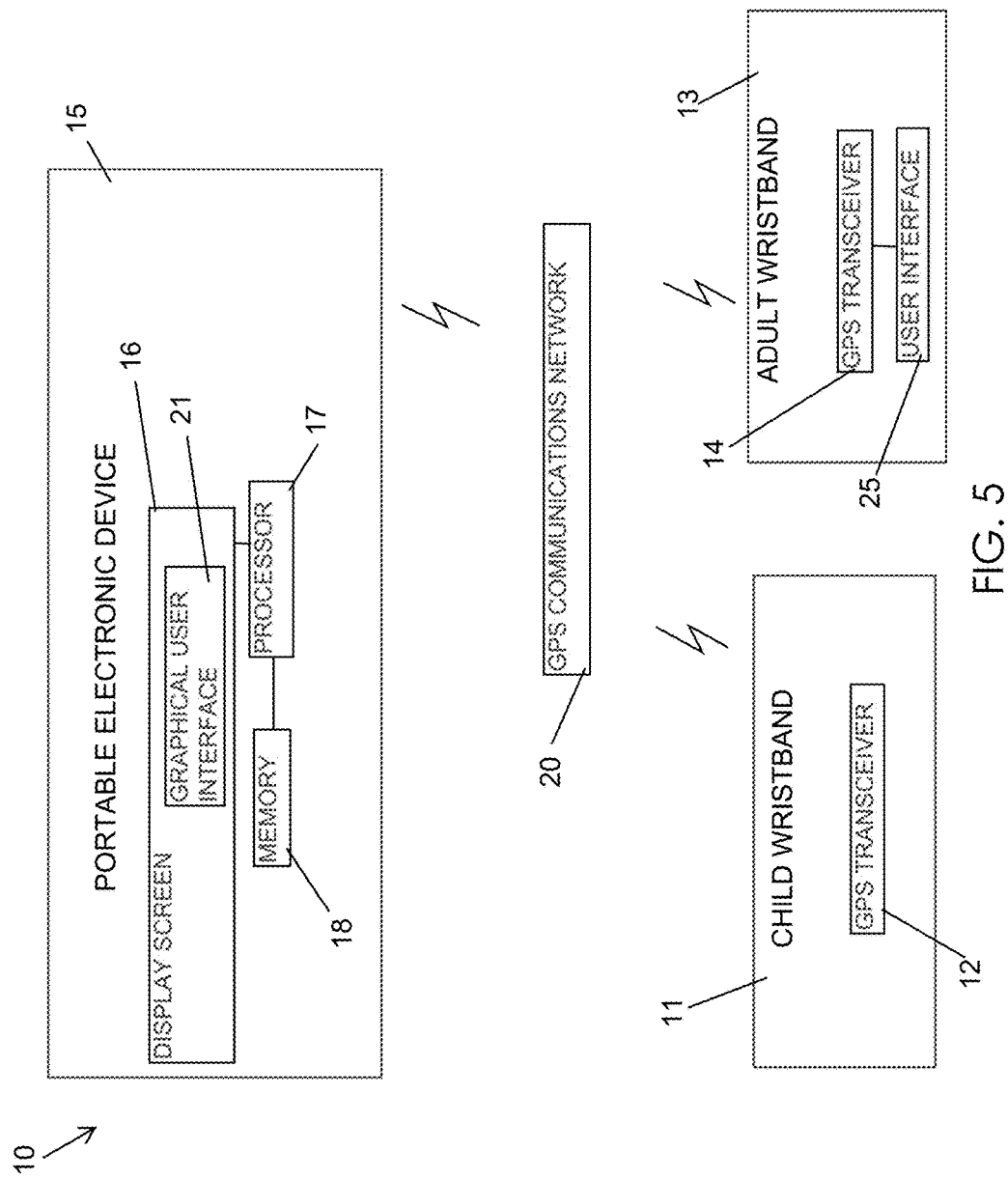

GPS MONITORING SYSTEM AND ASSOCIATED USE THEREOF

CROSS REFERENCE TO RELATED APPLICATIONS

This is a non-provisional patent application that claims the benefit of U.S. provisional patent application No. 62/417,662 filed Nov. 4, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to child location devices and, more particularly, to a specially configured GPS monitoring system for infants and children, as well as disabled or elderly adults for alerting parents and caregivers should their children, loved ones, or charges wander too far away from them or become lost, while helping to keep them safe and easily found, thereby effectively and quickly alleviating the risk of a missing, lost, or abducted child or adult.

Prior Art

Keeping their children safe from harm is one of the most paramount concerns of every parent. Whether it is openly discussing, calmly discouraging, or willfully forbidding such harmful acts as smoking, drug use, or unprotected sex, parents seek myriad ways to protect their kids in today's fast-paced world. While there are many potentially detrimental forces that can hurt children, parents feel confident that they have control over most of these. However, one of the greatest fears of every mother and father, and one which could render them helpless, is that their child will be lost or abducted. The Federal Bureau of Investigation estimates that more than 2,000 children are reported missing each day in the United States, adding up to nearly 750,000 children a year who run away from home or are the victims of a family or non-family abduction. Providing a visual to go along with these alarming statistics, bulletin boards in large shopping centers are virtually covered with missing children flyers and posters.

As diligent as parents are in keeping a constant eye on their little ones, children are very curious and energetic by nature. Walking through a mall, strolling along the fairway of an amusement park, or enjoying a day out at a city park provide many attractive distractions that may inspire kids to wander off and investigate. In a split second, a child can be lost in these crowded and busy places. To help parents keep inquisitive children in sight at all times, there are several items on the market that can facilitate constant contact. Very popular in recent years, a child leash has become an alternative to constantly holding a child's hand to keep him from scampering off. Similar in style to a dog leash, one end of this harness is tied to the parent's arm while the other end is secured around the child's wrist. While these leashes help parents keep active children close by, they can result in chafing of the skin, particularly if a rambunctious child is tethered to it.

Additionally, many people see the child leash as inhumane, and are discouraged from using one. In addition, parents have turned to two-way radios and even cellular telephones as means of staying in contact. While these costly items work well for close communication with kids old enough to be responsible for carrying them and using them, they could prove too challenging, and therefore impractical, as a security measure for younger children.

Accordingly, a need remains for GPS monitoring system in order to overcome at least one aforementioned shortcoming. The exemplary embodiment(s) satisfy such a need by providing a specially configured GPS monitoring system for infants and children, as well as disabled or elderly adults that is convenient and easy to use, lightweight yet durable in design, versatile in its applications, and designed for alerting parents and caregivers should their children, loved ones, or charges wander too far away from them or become lost, while helping to keep them safe and easily found, thereby effectively and quickly alleviating the risk of a missing, lost, or abducted child or adult.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured GPS monitoring system for infants and children, as well as disabled or elderly adults for alerting parents and caregivers should their children, loved ones, or charges wander too far away from them or become lost, while helping to keep them safe and easily found, thereby effectively and quickly alleviating the risk of a missing, lost, or abducted child or adult. These and other objects, features, and advantages of the non-limiting exemplary embodiment(s) are provided by a GPS monitoring system including a portable child wristband including a first GPS transceiver, a portable adult wristband including a second GPS transceiver in continuous communication with the first GPS transceiver, a portable electronic device in communication with each the child wristband and the adult wristband, and at least one communications network in communication with each the child wristband, adult wristband, and the portable electronic device.

Advantageously, the portable electronic device includes a display screen, a processor in communication with each the first GPS transceiver and second GPS transceiver and the display screen, and a memory communicatively coupled to the processor. Advantageously, the memory includes software instructions, when executed by the processor, that monitors whether a real-time location of the child wristband relative to a real-time location of the adult wristband is within an authorized maximum distance and within at an authorized geographic location and during an authorized time period.

In a non-limiting exemplary embodiment, the software instructions include the steps of: receiving the authorized time period, at the portable electronic device, during which the child wristband and the adult wristband are desired to be monitored; receiving the authorized maximum distance limit, at the portable electronic device, in which the child wristband is permitted to travel away from the adult wristband; and receiving the authorized geographic zone, at the portable electronic device, in which the authorized time period and the authorized maximum distance limit are desired to be monitored.

In a non-limiting exemplary embodiment, the software instructions further include the step of: receiving a real-time operating parameter signal from each the child wristband and the adult wristband. Advantageously, each the real-time operating parameter signal is bifurcated into first and second channels each including a first data stream defining a real-time transmission occurrence of the real-time operating signals, and a second data stream defining a real-time location of the child wristband and the adult wristband.

In a non-limiting exemplary embodiment, each real-time operating parameter signal is true when the real-time transmission occurrence is within the authorized time period, and a real-time distance between the child wristband and the adult wristband is greater than the maximum distance limit as well as within the authorized geographic zone. Advantageously, each real-time operating parameter signal is false when the real-time transmission occurrence is not within the authorized time period, or the real-time distance between the child wristband and the adult wristband is less than the maximum distance limit or not within the authorized geographic zone.

In a non-limiting exemplary embodiment, the software instructions further include the step of: if the real-time transmission occurrence is true, generating and transmitting a first alert signal to each the child wristband and the adult wristband as well as generating and graphically displaying, on the portable electronic device, a directional arrow identifying the real-time location of the child wristband relative to a real-time location of the adult wristband.

In a non-limiting exemplary embodiment, the software instructions further include the step of: if the real-time transmission occurrence is false, requesting the adult wristband to verify if the adult wristband wishes to know the real-time location of the child wristband.

The present disclosure further includes a method of utilizing a GPS monitoring system including the steps of: providing a child wristband including a first GPS transceiver; providing an adult wristband including a second GPS transceiver in continuous communication with the first GPS transceiver, wherein each of the child wristband and the adult wristband are portable; providing a portable electronic device in communication with each the child wristband and the adult wristband; and providing at least one communications network in communication with each the child wristband, adult wristband, and the portable electronic device. The portable electronic device includes a display screen, a processor in communication with each the first GPS transceiver and second GPS transceiver and the display screen, and a memory communicatively coupled to the processor. Advantageously, the memory includes software instructions, when executed by the processor, that monitors whether a real-time location of the child wristband relative to a real-time location of the adult wristband is within an authorized maximum distance at an authorized geographic location during an authorized time period.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 1 is a perspective view showing various embodiments of child wristbands/pendant and an adult wristband employed by the present GPS monitoring system, in accordance with a non-limiting exemplary embodiment of the present disclosure;

FIG. 2 is a perspective view of a portable electronic device employed by the present GPS monitoring system, in accordance with a non-limiting exemplary embodiment of the present disclosure;

FIG. 3 is a top plan view of the child wristbands/pendant and the adult wristband shown in FIG. 1;

FIG. 3a is an enlarged view of section 3a taken in FIG. 3, showing the adult wristband having the capability to set the maximum distance and other operating parameters;

FIG. 4 is a top plan view of the portable electronic device shown in FIG. 2; and FIG. 5 is a high-level schematic block diagram showing the interrelationship between the major electronic components of the GPS monitoring system.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means ±15% of the numerical.

If used herein, "substantially" means largely if not wholly that which is specified but so close that the difference is insignificant.

A non-limiting exemplary embodiment(s) of the present disclosure is referred to generally in FIGS. 1-5 and is intended to provide a specially configured GPS monitoring system 10 for infants and children, as well as disabled or elderly adults for alerting parents and caregivers should their children, loved ones, or charges wander too far away from them or become lost, while helping to keep them safe and easily found, thereby effectively and quickly alleviating the risk of a missing, lost, or abducted child or adult. It should be understood that the exemplary embodiment(s) may be used to by a variety of persons, and should not be limited to any particular age bracket described herein.

The non-limiting exemplary embodiment(s) is/are referred to generally in FIGS. 1-5 and is/are intended to provide a GPS monitoring system 10 including a portable child wristband 11, 11a, 11b (collectively referred to as 11) including a first GPS transceiver 12, a portable adult wristband 13 including a second GPS transceiver 14 in continuous communication with the first GPS transceiver 12, a portable electronic device 15 in communication with each the child wristband 11 and the adult wristband 13, and at least one communications network 20 in communication with each the child wristband 11, adult wristband 13, and the portable electronic device 15. Advantageously, the portable electronic device 15 (e.g., smart phone, tablet, laptop, etc.) includes a display screen 16, a processor 17 in communication with each the first GPS transceiver 12 and second GPS transceiver 14 and the display screen 16, and a memory 18 communicatively coupled to the processor 17. Advantageously, the memory 18 includes software instructions, when executed by the processor 17, that monitors whether a real-time location of the child wristband 11 relative to a real-time location of the adult wristband 13 is within an authorized maximum distance (e.g., 20 feet, 40 feet, etc.) and within at an authorized geographic location (e.g., sports stadium, amusement park, mall, parade, etc.) and during an authorized time period (e.g., during an event time period, all day, a portion of the day, etc.).

In a non-limiting exemplary embodiment, the software instructions include the steps of: receiving the authorized time period, at the portable electronic device 15, during which the child wristband 11 and the adult wristband 13 are desired to be monitored (e.g., the care provider enters the time directly at the graphical user interface 21 of the portable electronic device 15); receiving the authorized maximum distance limit, at the portable electronic device 15, in which the child wristband 11 is permitted to travel away from the adult wristband 13 (e.g., the caregiver enters the maximum distance either via the adult wristband user interface 25 or directly on the graphical user interface 21 of the portable electronic device 15); and receiving the authorized geographic zone, at the portable electronic device 15, in which the authorized time period and the authorized maximum distance limit are desired to be monitored (e.g., the caregiver identifies on a map the geographic zone of a sports stadium, amusement park, mall, parade, etc.).

In a non-limiting exemplary embodiment, the software instructions further include the step of: receiving a real-time operating parameter signal from each the child wristband 11 and the adult wristband 13 (e.g., during continuous repeated intervals, location signals are sent out). Advantageously, each the real-time operating parameter signal is bifurcated into first and second channels each including a first data stream defining a real-time transmission occurrence of the real-time operating signals (e.g., time stamped location signals), and a second data stream defining a real-time location of the child wristband 11 and the adult wristband 13 (e.g., GPS coordinate signals).

In a non-limiting exemplary embodiment, each real-time operating parameter signal is true when the real-time transmission occurrence is within the authorized time period, and a real-time distance between the child wristband 11 and the adult wristband 13 is greater than the maximum distance limit as well as within the authorized geographic zone. Advantageously, each real-time operating parameter signal is false when the real-time transmission occurrence is not within the authorized time period, or the real-time distance between the child wristband 11 and the adult wristband 13 is less than the maximum distance limit or not within the authorized geographic zone.

In a non-limiting exemplary embodiment, the software instructions further include the step of: if the real-time transmission occurrence is true, generating and transmitting a first alert signal to each of the child wristband 11 and the adult wristband 13 as well as generating and graphically displaying, on the portable electronic device 15, a directional arrow identifying the real-time location of the child wristband 11 relative to a real-time location of the adult wristband 13.

In a non-limiting exemplary embodiment, the software instructions further include the step of: if the real-time transmission occurrence is false, requesting the adult wristband 13 to verify if the adult wristband 13 wishes to know the real-time location of the child wristband 11. For example, the caregiver is requested to verify if he/she wishes to monitor the location of the child after a ball game is over, or outside a ball game stadium, etc. Thus, the caregiver can advantageously preprogram when and where to monitor the child's location ahead of time without having to constantly turn on/off the child wristband 11 and parent wristband 13.

The present disclosure further includes a method of utilizing a GPS monitoring system 10 including the steps of: providing a child wristband 11 including a first GPS transceiver 12; providing an adult wristband 13 including a second GPS transceiver 14 in continuous communication with the first GPS transceiver 12, wherein each of the child wristband 11 and the adult wristband 13 are portable; providing a portable electronic device 15 in communication with each the child wristband 11 and the adult wristband 13; and providing at least one communications network 20 in communication with each the child wristband 11, adult wristband 13, and the portable electronic device 15. The portable electronic device 15 includes a display screen 16, a processor 17 in communication with each the first GPS transceiver 12 and second GPS transceiver 14 and the display screen 16, and a memory 18 communicatively coupled to the processor 17. Advantageously, the memory 18 includes software instructions, when executed by the processor 17, that monitors whether a real-time location of the child wristband 11 relative to a real-time location of the adult wristband 13 is within an authorized maximum distance (e.g., 20 feet, 40 feet, etc.) and within at an authorized geographic location (e.g., sports stadium, amusement park, mall, parade, etc.) and during an authorized time period (e.g., during an event time period, all day, a portion of the day, etc.).

Referring to FIGS. 1-5 in general, in a non-limiting exemplary embodiment(s), the specially configured, multi-function alarm and monitoring system (GPS system 10) alerts parents when a child has wandered off or moved out of clear sight. A transceiver 12 is included for the child and transceiver 14 for the parent. An adjustable wristband 13 for parents and an anklet or wristband 11 for children that could be made of a soft yet durable material such as nylon. Enclosed in a compact durable plastic casing, the transceiver 14 may have two externally positioned buttons, an on/off switch and a button for the range control (collectively 25).

Integrated into the GPS monitoring system 10, preset range controls cover distances from 20 feet to 40 feet to 60 feet, or more. Should the child exceed the range limit, the system 10 activate according to time and geographic parameter settings. When this occurs, the child GPS transceiver 12 send a signal over via the GPS communications network 20 to portable electronic device 13. Alternately, a location signal could operate at either 27 MHz or 49 MHz via an RF or broadband spectrum. Both pairs of frequencies have been allocated by the FCC for other basic consumer items such as garage door openers, walkie-talkies, and radio-controlled toys. Both receiver and transmitter are powered using standard alkaline batteries or a rechargeable battery source, such as lithium, nickel-cadmium, or nickel-metal hydride.

Use of GPS monitoring system 10 is advantageous. First, the parent presses the power button on each unit to activate the system 10. Deciding on an appropriate range boundary for the child, the parent then use the external range setting button on either the parent wristband 13 and/or portable electronic device 15. By way of example, a mother may want to keep her five-year-old son within twenty feet during a trip to the supermarket during a certain time of day. Similarly, a father may feel that a range of one hundred feet is sufficient for a playground outing with his daughter in the afternoon. With the units powered on, both parent and child are protected by GPS monitoring system 10. Should the child wander past the preset range, an insistent beeping alert would emit from the bands 11, 13. While alerting the parent, this alarm also reminds the child to stay close by. The alarm continues until the child returns to the area within range of GPS monitoring system 10.

Advantageously, the GPS system monitors the specific whereabouts of a child via a software application (app) that is downloaded into a smartphone or other wireless device 15. Once activated, the app would utilize the device's LCD (Liquid Crystal Display) screen to graphically display the whereabouts of a missing child and pinpoint his or her exact location anywhere on earth.

GPS monitoring system 10 offers both parents and children numerous benefits and advantages. Foremost, this practical product provides an effective means of ensuring a child's safety and a parent's peace of mind. While shopping, on vacation, or even at home, parents feel confident that their children would not wander off or get lost without their knowledge. Using the latest technology, GPS monitoring system 10 keeps tabs on an out-of-sight child, emitting an audible alarm the instant a child moves beyond the preset range. Offered in adjustable wristband and anklet forms, GPS monitoring system 10 provides a comfortable, non-cumbersome fit for both parent and child. Not just for parents, the GPS monitoring system 10 proves beneficial to anyone responsible for child care, such as babysitters, nannies, and day care providers. While child safety has been the primary focus of this report, vulnerable adults benefit from this system 10, as well. For example, caretakers of elderly patients who may suffer from dementia or Alzheimer's Disease can rest assured that their loved ones would not be able to wander away too far, and get hurt, when protected by the GPS monitoring system 10.

GPS monitoring system 10 is an innovative and cleverly designed product which effectively and quickly alleviate the risk of a missing, lost, or abducted child or adult. Using today's technological advances, this unique device fosters a sense of security for both parents and children, as well as home and professional caretakers. GPS monitoring system 10 will be well received by parents, anyone else charged with caring for children, as well as the general consumer populace, a very sizable market potential.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A GPS monitoring system comprising:
   a child wristband including a first GPS transceiver;
   an adult wristband including a second GPS transceiver in continuous communication with said first GPS transceiver;
   a portable electronic device in communication with each said child wristband and said adult wristband; and
   at least one communications network in communication with each said child wristband, adult wristband, and said portable electronic device;
   wherein said portable electronic device includes
      a display screen,
      a processor in communication with each said first GPS transceiver and second GPS transceiver and said display screen, and
      a memory communicatively coupled to said processor and including software instructions, when executed by said processor, that monitors whether a real-time location of said child wristband relative to a real-time location of said adult wristband is within an authorized maximum distance at an authorized geographic location during an authorized time period;
   wherein each of said child wristband and said adult wristband are portable;
   wherein said software instructions comprise the steps of:
   receiving said authorized time period, at said portable electronic device, during which said child wristband and said adult wristband are desired to be monitored;
   receiving said authorized maximum distance limit, at said portable electronic device, in which said child wristband is permitted to travel away from said adult wristband; and
   receiving said authorized geographic zone, at said portable electronic device, in which said authorized time period and said authorized maximum distance limit are desired to be monitored;
   wherein said software instructions further comprise the step of:
   receiving a real-time operating parameter signal from each said child wristband and said adult wristband, each said real-time operating parameter signal being bifurcated into first and second channels each including
      a first data stream defining a real-time transmission occurrence of said real-time operating signals, and
      a second data stream defining a real-time location of said child wristband and said adult wristband;
   wherein each said real-time operating parameter signal is true when
      said real-time transmission occurrence is within said authorized time period; and
      a real-time distance between said child wristband and said adult wristband is greater than said maximum distance limit as well as within said authorized geographic zone;
   wherein each said real-time operating parameter signal is false when
      said real-time transmission occurrence is not within said authorized time period; or
      said real-time distance between said child wristband and said adult wristband is less than said maximum distance limit or not within said authorized geographic zone;
   wherein said software instructions further comprise the step of:
   if said real-time transmission occurrence is true, generating and transmitting a first alert signal to each said child wristband and said adult wristband as well as generating and graphically displaying, on said portable electronic device, a directional arrow identifying said real-time location of said child wristband relative to a real-time location of said adult wristband;
   wherein said software instructions further comprise the step of:
   if said real-time transmission occurrence is false, requesting said adult wristband to verify if said adult wristband wishes to know said real-time location of said child wristband.

* * * * *